United States Patent
Gamain

(10) Patent No.: US 9,638,229 B2
(45) Date of Patent: May 2, 2017

(54) CONNECTION DEVICE FOR ASSEMBLING TOGETHER TWO MEMBERS

(71) Applicant: AGAM Group, Ltd, Elkridge, MD (US)

(72) Inventor: Claude Gamain, Rueil Malmaison (FR)

(73) Assignee: AGAM Group, Ltd, Elkridge, MD (US)

( * ) Notice: Subject to any disclaimer, the term of this patent is extended or adjusted under 35 U.S.C. 154(b) by 357 days.

(21) Appl. No.: 14/310,189

(22) Filed: Jun. 20, 2014

(65) Prior Publication Data

US 2014/0376998 A1    Dec. 25, 2014

(30) Foreign Application Priority Data

Jun. 21, 2013 (FR) ...................... 13 55906

(51) Int. Cl.
    *F16B 9/02*       (2006.01)
    *F16B 7/04*       (2006.01)

(52) U.S. Cl.
    CPC ............ *F16B 9/023* (2013.01); *F16B 7/0473* (2013.01); *Y10T 29/49826* (2015.01); *Y10T 403/595* (2015.01)

(58) Field of Classification Search
    CPC ...... F16B 9/023; F16B 7/0473; F16B 19/109; B64G 1/641; E04B 1/1906; Y10T 403/347; Y10T 403/342; Y10T 403/4662; Y10T 403/595; Y10T 29/49826

USPC ............... 403/322.4, 252, 171, 176; 52/646; 248/506
    See application file for complete search history.

(56) References Cited

U.S. PATENT DOCUMENTS 4,998,842 A * 3/1991 Sheridan ................ B64G 1/641
                                                403/171

FOREIGN PATENT DOCUMENTS

EP    2 481 937 A1    8/2012
FR    2 721 377 A1    12/1995

OTHER PUBLICATIONS

French Search Report for 1355906 dated Mar. 14, 2014.

* cited by examiner

*Primary Examiner* — Gregory Binda
*Assistant Examiner* — Jeffery Acker
(74) *Attorney, Agent, or Firm* — Sughrue Mion, PLLC

(57) ABSTRACT

A connection device for assembling together a receiver first section member presenting an inner cavity, and a fastener second section member presenting a groove having a constricted opening. The connection device includes a cage forming a pair of jaws for coming into engagement in the groove. The device also including a resilient drive mechanism for urging a spacer member between the jaws so as to space them apart in such a manner as to come into engagement with the groove through the constricted opening; and a pivotable lever that pivots about a pivot pin, the pivotable lever including a lever arm and a thrust head that engages the spacer member so as to move it against the force exerted by the resilient drive mechanism on the spacer member.

12 Claims, 3 Drawing Sheets

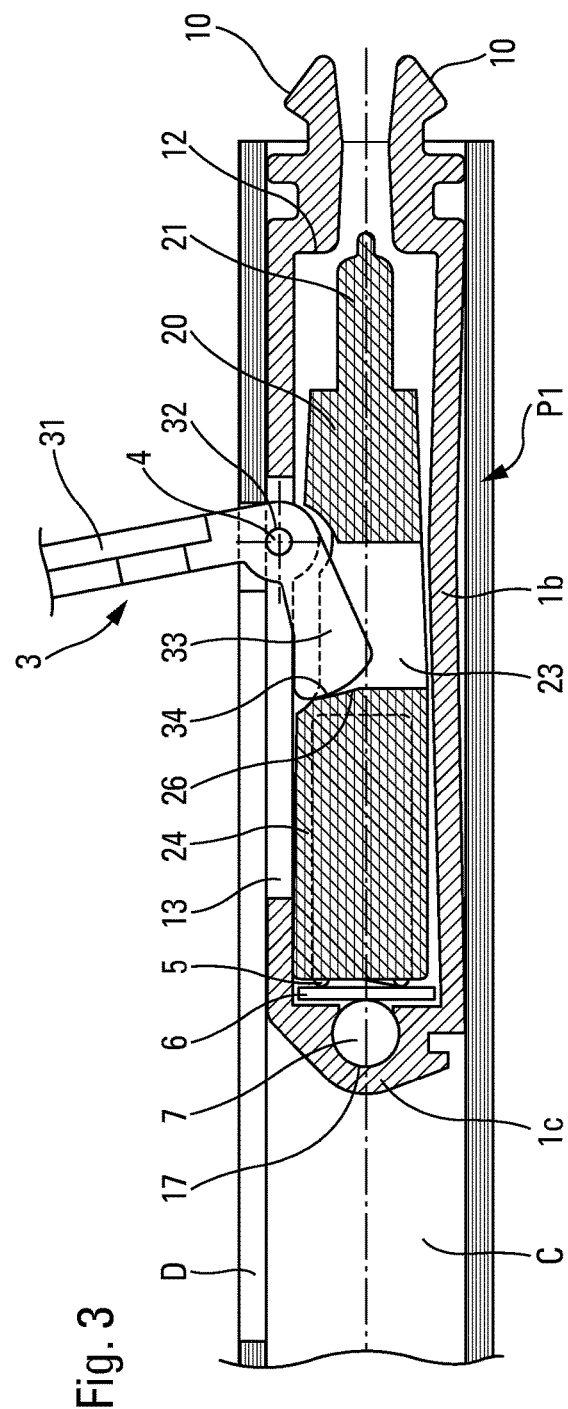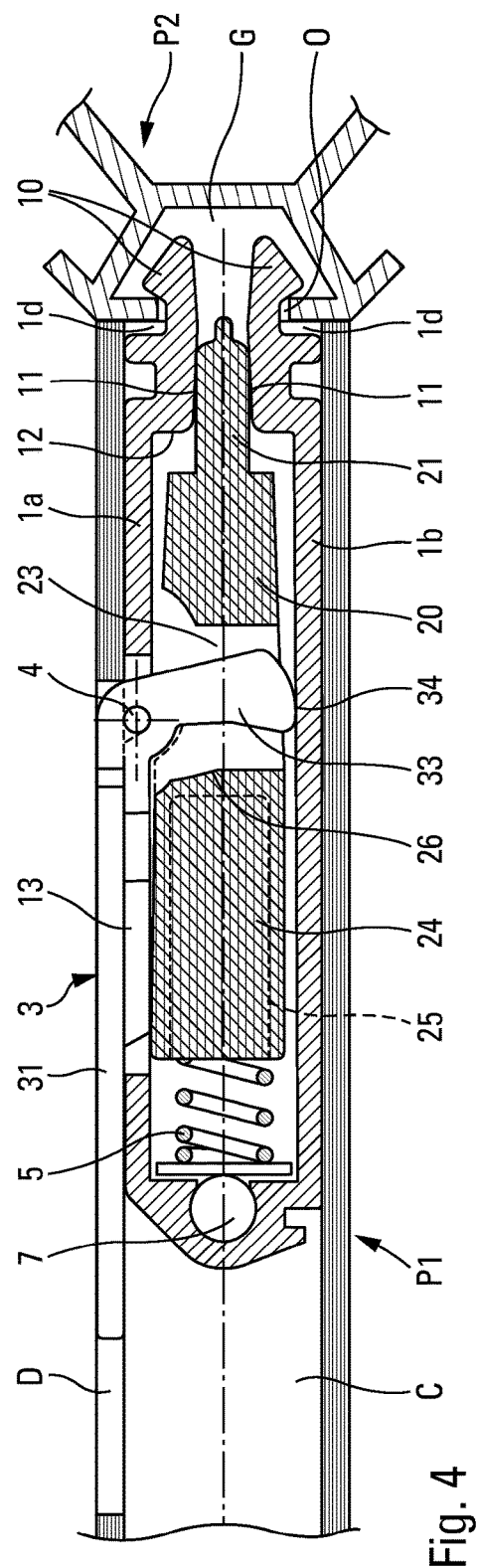
Fig. 3
Fig. 4

CONNECTION DEVICE FOR ASSEMBLING TOGETHER TWO MEMBERS

The present invention relates to a connection device for assembling together a receiver first section member presenting an inner cavity, and a fastener second section member presenting at least one groove having a constricted opening. The connection device is intended to be received in stationary manner in the inner cavity of the receiver member and includes a cage forming a pair of jaws for coming into engagement in the groove of the fastener member through its constricted opening. The device also includes a spacer member for spacing the jaws apart, and actuator means for moving the spacer member relative to the jaws. The actuator means include a pivotable lever that pivots about a pivot pin. The advantageous fields of application of the present invention are the fields of exhibition equipment known as general installation equipment and secondarily exhibition and/or office furniture, fields in which it is necessary to be able to mount and remove structures and/or pieces of furniture quickly. Naturally, the present invention may also be used in any other field in which two members need to be assembled together, preferably perpendicularly.

In the prior art, document FR 2 971 026 is already known in which the actuator means include a connection bar that is connected to the pivotable lever via a second pivot pin and to an abutment element via a third pivot pin, the three pivot pins being parallel, the distance between the first pin and the third pin being variable by actuating the lever. In addition, lowering the lever has the effect of compressing a spring which urges the spacer member between the jaws. Conversely, raising the lever has the effect of expanding the spring. In addition, using a connection bar makes it possible to multiply the force of the lever, but naturally that would require an additional part which entails manufacturing and assembly costs. Finally, assembling the connection device requires making a deep reception notch in the receiver member which detracts from its overall appearance.

Document FR 2 721 377 is also known that describes a connection device of the same general type. The device includes a movable hairpin-shape forming a pair of jaws. In order to space the jaws of the hairpin-shape apart, stationary spacer means are provided, and in order to move the hairpin-shape, cam means are provided including a pivotable lever that pivots about a pin and to which an eccentrically-mounted disk is associated. The device further includes a cage inside which the hairpin-shape, the spacer means, and the cam means are received. Thus, the hairpin-shape moves in the cage under the action of the eccentric disk that is actuated by the pivotable lever, and its jaws are spaced apart by the spacer means that are stationary in the cage. Consequently, the connection device requires the use of a stationary cage and of a movable hairpin-shape. In addition, other than the lever, the cam means include a movable pin that biases the hairpin-shape by means of a spring. As a result, actuation of the lever is difficult and requires significant force.

An object of the present invention is to provide a connection device having an actuation principle that is different. Another object is to guarantee the engagement of the jaws in the groove of the fastener member, independently of the complete lowering of the pivotable lever. Another object is to reduce the number of parts. Still another object is to make it easier to assemble the connection device in a receiver member, paying attention very particularly to the appearance aspect.

To achieve these objects, the present invention proposes that connection device includes:
  resilient drive means for urging a spacer member between the jaws so as to space them apart in such a manner as to come into engagement with the groove through the constricted opening; and
  a pivotable lever that pivots about a pivot pin, the pivotable lever comprising a lever arm that is suitable for being gripped manually, and a thrust head that comes into engagement with the spacer member so as to move it out from the jaws against the force exerted by the resilient drive means on the spacer member.

Thus, unlike prior-art connection devices, it can be considered that the connection device of the present invention functions with an inverted mode of actuation in the sense that the pivotable lever is not used to force the spacer member between the jaws so as to space them apart, but, on the contrary, it is used to remove or disengage the spacer member from between the jaws so as to enable them to move together in order to insert or remove them from the groove of the fastener member.

Advantageously, the thrust head is out of contact with the spacer member when the jaws are engaged in the groove, such that the spacer member is urged between the jaws only by the resilient drive means. This clearly shows that the lever has absolutely no involvement in pushing the spacer member between the jaws engaged in the groove.

In an advantageous embodiment, the thrust head includes a contact zone that is suitable for coming into engagement both with the spacer member when the lever arm is at a distance from the cage, and with a branch of the cage when the lever arm is folded down on the cage, the branch of the cage advantageously being flexible so as to be deformed by the contact zone of the thrust head. Thus, when the jaws are in engagement with a groove, the contact zone bears against the flexible branch of the cage and is advantageously out of contact with the spacer member. The elastic deformation of the flexible branch makes it possible to hold the lever in position, with the lever arm pressed against the cage.

In a practical embodiment, the spacer member, advantageously made as a single piece, comprises a front portion forming a spacer blade or flange that comes into engagement between the jaws, a rear portion in engagement with resilient drive means, and a central portion forming a window in which the thrust head moves so as to come into engagement with the rear portion and/or the cage. By way of example, the spacer member may be in the form of a single piece made of injection-molded plastics material.

In a very advantageous aspect, the cage may include a bearing groove for the ends of the pivot pin of the pivotable lever. In this way, the two ends of the pin of the pivotable lever may merely be placed in the reception bearing which is then completed or covered by the receiver member.

According to another characteristic of the invention, the spacer member may include a spacer flange that comes into engagement with converging surfaces of the jaws so as to space them apart progressively until they come into clamping engagement with the constricted opening of the groove of the fastener member.

In another advantageous aspect, the cage includes an open housing for receiving a blocking pin making it possible to fasten the device in the cavity of the receiver member, the blocking pin advantageously passing through the two branches and the spacer member, the blocking pin advantageously being urged by a spring so as to project out from one of the branches. The blocking pin may take various forms, e.g. just a rod, or a screw or a bolt, or even a spring-mounted pin. The blocking pin penetrates into a borehole of the receiver member that may be formed in the top, the bottom, or one of the sides of the member.

The present invention also defines a receiver section member presenting an inner cavity containing a connection device as defined above, the receiver member including a cutout presenting a continuous annular edge in which the lever arm is arranged. Advantageously, the cutout is generally elongate, but forms an end extension presenting a small width defining two opposite bearing edges below which the ends of the pivot pin of the pivotable lever are engaged.

The present invention also defines a method of assembling a connection device as defined above in a receiver section member as defined above, the method comprising the following successive steps:

a—removing the pivotable lever and its pivot pin from the cage;

b—engaging the cage in the cavity of the receiver member;

c—putting the pivotable lever into place with its pivot pin in the cage through the cutout;

d—moving the assembled connection device in the cavity so as to engage the ends of the pivot pin below the edges of the cutout; and e—blocking the cage in the cavity of the receiver member.

In practice, the cage with its spacer member is inserted by sliding into the open end of the cavity and driving it in until the reception bearing is arranged at the widest width of the cutout, so as to be able to put the pivot pin mounted on the lever into place in the reception bearing. Then, the assembled connection device is moved by sliding in the cavity until the ends of the pivot pin of the pivotable lever are engaged below the bearing edges defined by the end extension of the cutout that presents a small width. It then suffices to lock the connection device by any means in the cavity of the receiver member. This assembly method presents the advantage that the cutout of the receiver member is "closed", and not open on the end of the receiver member in the form of a deep notch. With this "closed" cutout, the receiver member is weakened much less than it would be with a conventional deep notch. This method of assembly by inserting the pivot pin in a bearing on the cage that is completed by the receiver member is a characteristic that may be protected per se, independently of the action of the lever against the spring in order to open the connection device.

A principle of the present invention is to use the pivotable lever not to clamp the jaws in the groove, but to enable the jaws to move together, inverting its conventional operation. Another principle of the invention is to arrange the pivot pin of the lever in an open bearing of the cage that is then covered by the receiver member. These two principles are linked by the common concept in which the lever does not intervene in pushing the spacer member between the jaws, such that it is possible to put the lever (with its pin) into place on the cage without being hindered or prevented by the action of the resilient drive means. And this concept is the basis of the connection device and of its method of assembly in a receiver member.

The invention is described more fully below with reference to the accompanying drawings, which show an embodiment of the present invention by way of non-limiting example, together with a variant.

In the figures:

FIG. 3 is a view similar to the view in FIG. 1 with the pivotable lever raised;

FIG. 4 is a view similar to the views in FIGS. 1 and 3 with the pivotable lever lowered down and with the jaws in engagement with a fastener member.

Reference is made to all of FIGS. 1 to 6 in order to describe in detail the structure and the operation of a connection device made in accordance with a non-limiting embodiment of the invention. The connection device is for mounting in stationary manner in a cavity C of a receiver section member P1, as can be seen in FIGS. 1 to 4. Jaws 10 of the connection device project out from the cavity C so as to be able to come into engagement with a fastener section member P2 that forms a groove G having a constricted opening O. It can be seen in FIG. 4 that the two jaws 10 are arranged inside the groove G, in engagement with the constricted opening O. In this way, the fastener member P2 is assembled securely to the receiver member P1. The triangular configuration of the external ends of the jaws 10 even contributes to exerting traction on the member P2 so as to press it flat against the member P1. In this way, it is possible to eliminate any clearance between the two members P1 and P2. When assembled together in this way, the member P2 extends perpendicularly to the member P1. It can also be said that the end of the member P1 is connected to the length of the member P2. The members P1 and P2 may be made using any technique and any material, but preferably they are made by extruding aluminum.

Figure 2:
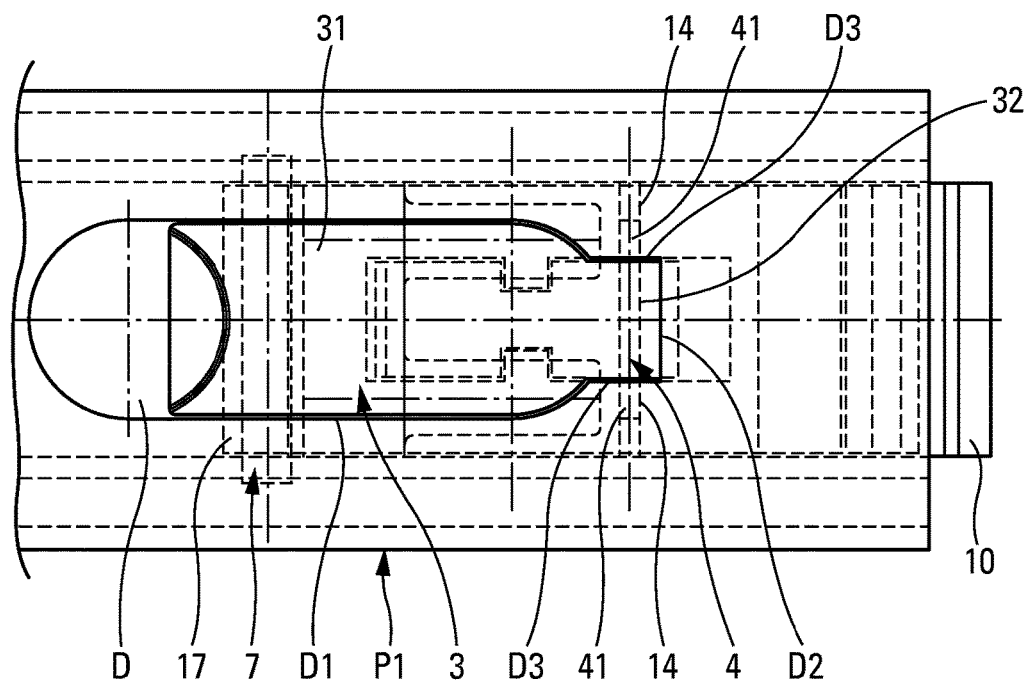
FIG. 2 is a transparent plan view of the FIG. 1 connection device engaged in the cavity of a receiver member, with the pivotable lever lowered down.

According to an advantageous characteristic of the invention, the receiver member P1 is formed with a cutout D made by punching its top face, for example. The cutout D is "closed", such that it defines a continuous annular edge D1 that is closed." The edge D1 does not communicate with the end of the member P1. With reference to FIG. 2, it can be seen that the edge D1 of the cutout D presents a generally elongate or oblong shape in the direction of the member. However, it should be observed in FIG. 2 that the right-hand end of the cutout D forms an end extension D2 presenting a width that is smaller than the width of the remainder of the cutout. The extension D2 thus defines two opposite bearing edges D3 having a function that is described below.

According to another characteristic of the invention, the receiver member P1 is made with one or two blocking holes that are suitable for receiving a blocking pin for fastening the connection device in stable manner in the cavity C of the receiver member P1.

The connection device of the invention comprises a plurality of component elements, namely: a cage 1; a spacer member 2; a pivotable lever 3; one or more springs 5; and a blocking pin 7. Optionally, the connection device may include a small plate 6 between the spring 5 and the pin 7.

Figure 5:
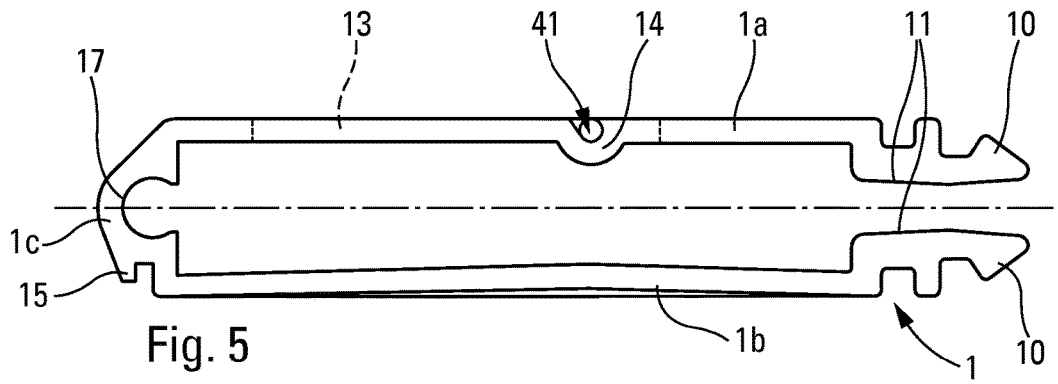
FIG. 5 is a cross-section view through the cage of the connection device of the preceding figures.
Figure 6:
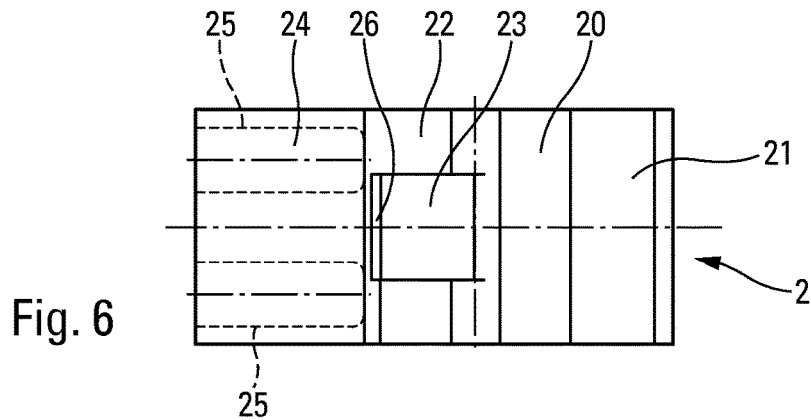
FIG. 6 is a plan view of the spacer member of the connection device in FIGS. 1 to 4.

Advantageously, the cage 1 is made by extruding aluminum. Consequently, the cage 1 presents a uniform section and its width may be about 27 mm, for example. The cage 1 is in the form of a hairpin-shape comprising two substantially-parallel branches 1a and 1b that are interconnected at one of their ends via a junction section 1c. The section 1c advantageously forms an open housing 17 for receiving the blocking pin 7. The pin projects axially out from the housing 17 on either side of the cage, as can be seen in FIG. 2. Thus, the ends of the pin 7 serve as blocking studs inside the cavity C of the receiver member. To this end, the receiver member forms two through holes for the blocking pin 7 that is engaged in the cage 1 once the cage has been inserted into the cavity C of the receiver member P1. The blocking pin 7 alone may fasten the connection device inside the cavity C of the receiver member P1. Section 1c also forms a hook 15 that may be used to fasten an accessory, e.g. a cover element for closing, in part, the cutout D formed in the receiver member P1. At the end remote from the junction section 1c, the two branches 1a and 1b form the jaws 10 of the connection device. Each of the jaws 10 forms a reception groove 1d in which there is received a corresponding edge of the constricted opening O, as shown in FIG. 4. It should also be observed that the two jaws 10 extend towards each other at the ends of the branches 1a and 1b, forming an internal shoulder 12 that decreases the distance between the two jaws 10. Advantageously, the jaws 10 form two converging surfaces 11 that converge towards each other in such a manner as to decrease even further the distance separating them. The two converging surfaces 11 converge towards each other going from the shoulders 12 towards the free ends of the jaws 10. The function of the converging surfaces 11 is described below. The branch 1a forms a large opening 13 through which the pivotable lever 3 can pass. On either side of the large opening 13, the branch 1a forms an open reception bearing 14 that may be in the form of a rectilinear groove. FIG. 5 is a vertical section view through the cage 1, but outside the large opening 13 so as to show the reception bearing 14. In addition, at rest, the branch 1b of the cage 1 presents a curve, as can be seen in FIG. 3, so that it may be elastically deformed outwards (towards the bottom in the figures) towards the inner wall of the cavity C. The branch 1b thus presents a configuration and flexibility that enable it to be deformed with shape memory.

In order to space apart the jaws 10 of the cage 1, the spacer member 2 is movable in the cage 1 along a movement axis X. The spacer member 2 is preferably made as a single piece, e.g. by injection molding an appropriate plastics material. However, it could also be made by assembling together a plurality of parts. The spacer member 2 advantageously includes a front portion 20 forming a spacer blade or flange 21 that comes into engagement between the jaws 10 so as to space them apart. The spacer member 2 also includes a rear portion 24 that forms one or preferably two blind housings 25 for receiving resilient drive means, and a thrust wall 26 that is remote from the inlets of the blind housings 25. Between the front and rear portions 20, 24, the spacer member 2 forms a central portion 22 that is pierced with a window 23 having an edge that is defined by the thrust wall 26. Such a spacer member 2 is clearly visible in FIG. 6.

The spacer member 2 is arranged inside the cage 1 between its two branches 1a and 1b, with its spacer blade 21 directed towards the jaws 10, or received between them. The spacer member 2 is resiliently urged by appropriate means towards the jaws. By way of example, the resilient drive means may be in the form of one or preferably two springs 5 that are received in the blind housings 25 of the spacer member. In addition, the springs 5 bear against the junction section 1c of the cage. Advantageously, the springs 5 bear against a plate 6 which in turn bears against the blocking pin 7 that is engaged in the open housing 17 of the cage. Thus, by means of the plate 6, the springs 5 ensure that the pin 7 is held in stable manner in the housing 17. In FIG. 2, it can be seen that the two ends of the pin are engaged in corresponding blocking holes formed in the receiver member P1, thereby guaranteeing that the connection device is blocked in the cavity C of the member P1.

The spacer blade 21 is for inserting between the two converging surfaces 11 of the jaws 10. The blade 21 preferably presents a free end that is pointed or rounded so as to make it easier to move between the two converging surfaces 11. In the various figures, it can be seen that the spacer blade 21 can move in the cage 1 between the jaws 10 between two extreme positions corresponding to FIG. 1 and to FIG. 3. In FIG. 3, the spacer blade 21 is not even in engagement with the converging surfaces 11. Its end is barely engaged between the two surfaces. In contrast, in FIG. 1, the spacer blade 21 is engaged fully between the jaws 10 and spaces them apart fully. In contrast, with reference to FIG. 4, it can be seen that the spacer blade 21 is not engaged fully between the converging surfaces 11, as in FIG. 1. The blade 21 cannot be engaged further, given that the jaws 10 are in engagement with the constricted opening O of the groove G. FIG. 4 corresponds to a given configuration for one size of constricted opening O. With a smaller opening O, the spacer blade 21 would be engaged less fully between the converging surfaces 11 of the jaws 10.

The pivotable lever 3 comprises a lever arm 31 that may be gripped and manipulated manually by means of one or two fingers, a thrust head 33 that is connected in stationary manner to the lever arm 31 and that extends substantially perpendicularly to the lever arm 31, and a pin bearing 32 that is arranged substantially at the junction between the lever arm 31 and the thrust head 33. The bearing 32 is advantageously open over its entire length so as to receive a pivot pin 4. In a variant, the bearing 32 could be closed so that the pivot pin 4 must be inserted into the bearing via one of its ends. However, the embodiment in which the bearing 32 is open over its entire length presents the advantage of being able to put the pivot pin 4 into place laterally by pushing on the pin until it snap-fastens inside the open bearing 32. The pivot pin 4 includes two opposite pin ends 41 that project out from either side of the bearing 32. The pin ends 41 are received in the bearing groove 14 formed in the branch 1a of the cage, as shown in FIGS. 2 and 5. In addition, the receiver member P1 extends just above the bearing groove 14, with its two opposite bearing edges D3 formed by the end extension D2 of the cutout D formed in the member P1. It can thus be said that the member P1 completes the bearing groove 14 of the cage so that together they form a complete bearing in which the pin ends 41 of the pivot pin 4 are received. Between the two pin ends 41, the pivot pin 4 is received in the bearing 32 formed by the pivotable lever 3.

The thrust head 33 forms a contact zone 34 that is situated approximately at its free end remote from the bearing 32. The contact zone 34 may come into bearing contact with the thrust wall 26, as shown in FIG. 3. The lever arm 31 thus extends substantially vertically, while the thrust head 33 is generally horizontal. In this position, the spacer member 2 has been moved as far as possible towards the connection section 1c, compressing the springs 5 to their maximum. The spacer blade 21 is completely removed from between the jaws 10 such that it is possible to move them towards each other, in particular for inserting them into, or for removing them from, the groove G of a fastener member P2. It should be observed that the pivotable lever 3 has the function of moving the spacer member 2 against the springs 5. The position shown in FIG. 3 is a stable position, given that the contact zone 34 comes to bear against a sloping portion of the thrust wall 26. The receiver member P1 may thus be manipulated with its connection device so as to fit it into the groove G of a fastener member P2. Once the two jaws 10 are engaged in the groove G through the constricted opening O by resiliently moving the jaws together, the lever arm 31 may be folded down on the cage in such a manner as to fit perfectly inside of the cutout D of the member P1. The lever arm 31 may occupy all of the cutout D or, preferably, a grip hole may be left so as to enable a user to pass a finger inside the cavity so as to grip the lever arm 31 from below. For reasons of appearance, it is possible to provide an accessory in the form of a spring cover that is held at the hook 15 so as to complete and close the cutout D where the user is to pass a finger. In any event, when the lever arm 31 is folded down completely, as shown in FIG. 4, the thrust head 33 is arranged substantially vertically, and its contact zone 34 comes to bear hard against the bottom branch 1b that is thus deformed, flattening its curve in the rest state. Specifically, it should be observed in FIG. 3 that the bottom branch 1b presents a slight curve, while in FIG. 4, the curve has disappeared as a result of the branch 1b being deformed by the thrust head 33 that bears against its contact zone 34. Deforming the bottom branch 1b may even contribute to making the connection device even more stable inside the receiver member P1. It should be observed that the thrust head 33 is arranged inside the window 23, but out of contact with the spacer member 2. This means that the spacer blade 21 is urged between the jaws 10 by urging from the springs 5 only, the thrust head 33 having no effect. As mentioned above, the depth of penetration of the spacer blade 21 between the jaws 10 depends on the size of the constricted opening O of the groove G of the fastener member P2. In any event, it can be said that in almost all circumstances, the engagement of the spacer blade 21 between the jaws 10 results from urging from the springs 5 only, and not from the thrust head 33.

Figure 1:
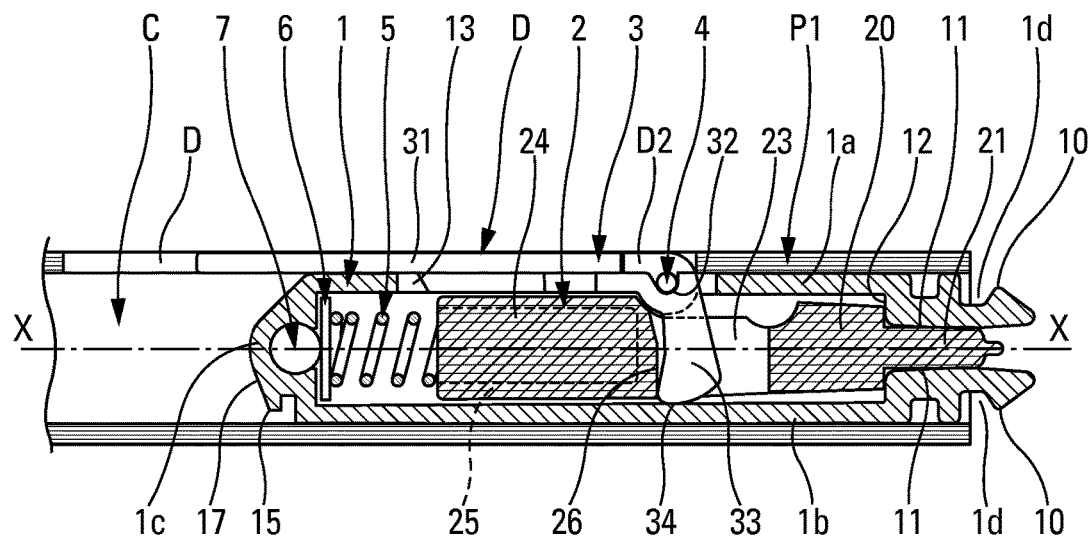
FIG. 1 is a longitudinal cross-section view through the FIG. 1 connection device engaged in the cavity of a receiver member, with the pivotable lever lowered.

In FIG. 1, the jaws 10 are not in engagement with a groove of a fastener member, such that they may be spaced apart fully. As a result, the springs 5 push the spacer member 2 fully between the jaws 10. The front portion 20 of the spacer member may even come into abutment against the shoulders 12 formed just upstream from the jaws 10. The pivotable lever 3 is in the same position as in FIG. 4, i.e. with its lever arm 31 folded down in the cutout D, and the thrust head 33 arranged vertically with its contact zone 34 in deforming bearing engagement with the bottom branch 1b. The thrust head 33 may possibly come into light contact with the thrust wall 26, or remain spaced apart therefrom. In any event, the folded-down position of the pivotable lever is guaranteed by the bearing contact of the contact zone 34 with the curved branch 1b. It should be observed that the pivotable lever 3 is not subjected to any urging or stress from the spacer member 2.

The absence of stress on the pivotable lever 3 in the configuration in FIG. 1 is a major advantage in the method of assembling the connection device inside the cavity C of the receiver member P1. Specifically, as a result of the absence of stress or urging on the pivotable lever 3, it is possible to put it into place on the cage 1 through the cutout D, while the cage 1 with its spacer member 2 and its springs 5 are already in place inside the cavity. To do this, it suffices to push the cage 1 fully inside the cavity C, in such a manner as to arrange the bearing grooves 14 of the cage 1 at the widest portion of the cutout D. It is then easy to put the pivotable lever 3 into place, arranging the pin ends 41 of the pivot pin 4 in the pin grooves 14 of the cage. Then, it suffices to cause the connection device to slide inside the cavity, so as to move the pin grooves 14 with their pin ends 41 to the end extension D2 of the cutout D, so that the bearing edges D3 cover the pin grooves 14 and the pin ends 41. This is shown very clearly in FIG. 2. Finally, it suffices to engage the blocking pin 7 through the through holes of the member P1 and the open housing 17, so as to block the connection device of the invention permanently inside the receiver profile P1. It should be recalled that this particularly advantageous method of assembly is possible only because the pivotable lever 3 may be put into place without being subjected to any stress or urging from the spacer member 2, which is subjected to urging from the springs 5 only.

Figure 7:
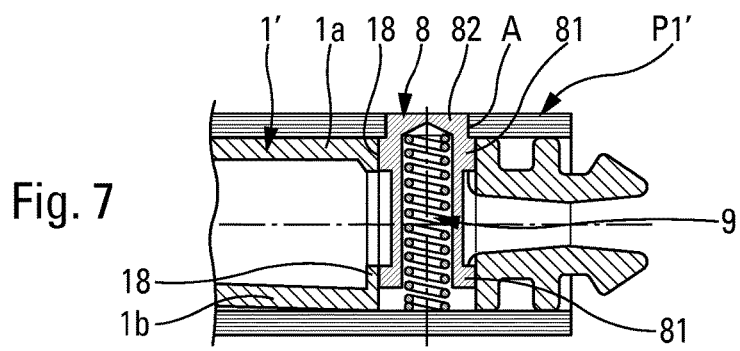
FIG. 7 is a longitudinal cross-section view through a variant of the connection device.
Figure 8:
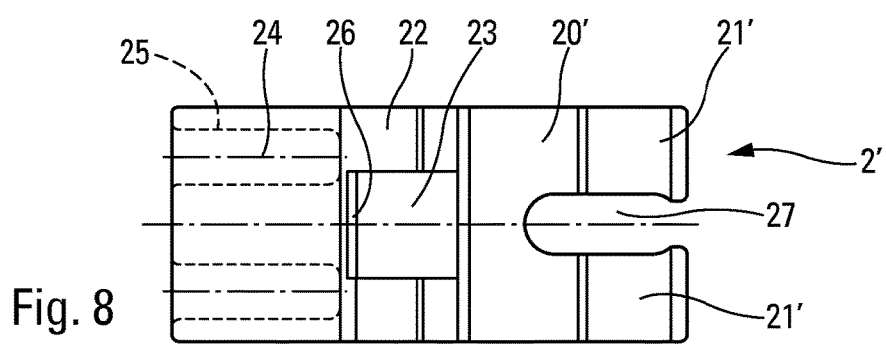
FIG. 8 is a plan view of the spacer member of the connection device in FIG. 7.

Reference is made below to FIGS. 7 and 8 in order to describe a variant for the blocking pin 7. By way of example, it is possible to make a blocking pin 8 that does not extend horizontally like the blocking pin 7, but rather extends vertically through the 2 branches 1a and 1b and the spacer member 2'. More precisely, in each branch 1a, 1b it is possible to have a borehole 18, and in the spacer member 2' it is possible to have a notch 27 that may, for example, open out in the spacer blade 21', which is thus divided into two portions. The remainder of the spacer member 2' may be identical to the spacer member in FIG. 6. The receiver member P1' is made with a blocking borehole A that is arranged between the cutout D and the end edge of the member. The blocking pin 8 may be in the form of a lug 81 that extends through the boreholes 18 and the notch 27, and that includes a blocking and actuator head 82 that is engaged in the borehole A of the receiver member P1. The lug 81 is urged by the spring 9 that bears against the inner bottom wall of the receiver member P1'. With the blocking pin 8, it is possible to block the connection device in the receiver member P1' without any special manipulation, given that the stud 82 becomes housed automatically in the borehole A under the action of the spring 9, whenever the stud 82 is in perfect alignment with the borehole A.

Instead of the blocking pin 8, it is also possible to provide a simple screw or a bolt, which does not however present the same advantages.

The invention thus provides a connection device having a spacer member that is urged between the jaws by the resilient drive means only, thus leaving the pivotable lever free from any stress, and thereby enabling the connection device to be assembled in a receiver member in advantageous manner.

The invention claimed is:

1. A connection device for assembling together a receiver first section member presenting an inner cavity, and a fastener second section member presenting at least one groove having a constricted opening, the connection device configured to be received in stationary manner in the inner cavity of the receiver member, the connection device including a cage having two branches forming a pair of jaws for coming into engagement in the groove of the fastener member through a constricted opening, the device comprising:
   resilient drive means for urging a spacer member between the jaws so as to space the jaws apart in such a manner as to come into engagement with the groove through the constricted opening; and
   a pivotable lever that pivots about a pivot pin, the pivotable lever comprising a lever arm that is accessible and configured to be gripped manually, and a thrust head that comes into engagement with the spacer member so as to move the space member out from the jaws against the force exerted by the resilient drive means on the spacer member.

2. A connection device according to claim 1, wherein the thrust head is out of contact with the spacer member when the jaws are engaged in the groove, such that the spacer member is urged between the jaws only by the resilient drive means.

3. A connection device according to claim 1, wherein the thrust head includes a contact zone that is suitable for coming into engagement both with the spacer member when the lever arm is at a distance from the cage, and with a branch of the cage when the lever arm is folded down on the cage, the branch of the cage advantageously being flexible so as to be deformed by the contact zone of the thrust head.

4. A connection device according to claim 1, wherein the spacer member, advantageously made as a single piece, comprises a front portion forming a spacer flange that comes into engagement between the jaws, a rear portion in engagement with resilient drive means, and a central portion forming a window in which the thrust head moves so as to come into engagement with the rear portion and/or the branch.

5. A connection device according to claim 1, wherein the cage includes a bearing groove for ends of the pivot pin of the pivotable lever.

6. A connection device according to claim 1, wherein the spacer member includes a spacer blade that comes into engagement with converging surfaces of the jaws so as to space them apart progressively until they come into clamping engagement with the constricted opening of the groove of the fastener member.

7. A connection device according to claim 1, wherein the cage includes an open housing for receiving a blocking pin making it possible to fasten the device in the cavity of the receiver member, the blocking pin advantageously passing through the two branches and the spacer member, the blocking pin advantageously being urged by a spring so as to project out from one of the branches.

8. A receiver section member presenting an inner cavity containing a connection device according to claim 1, the receiver member including a cutout presenting a continuous annular edge in which the lever arm is arranged.

9. A receiver section member according to claim 8, wherein the cutout is generally elongate, but forms an end extension presenting a small width defining two opposite bearing edges below which ends of the pivot pin of the pivotable lever are engaged.

10. A method of assembling a connection device in a receiver section member according to claim 8, the method comprising the following successive steps:
  a—removing the pivotable lever and the pivot pin from the cage;
  b—engaging the cage in the cavity of the receiver member;
  c—putting the pivotable lever into place with the pivot pin in the cage through the cutout;
  d—moving the assembled connection device in the cavity so as to engage ends of the pivot pin below the edges of the cutout; and
  e—blocking the cage in the cavity of the receiver member.

11. A method of assembling a connection device in a receiver section member, comprising the following successive steps:
  providing the connection device for assembling together a receiver first section member presenting an inner cavity, and a fastener second section member presenting a groove having a constricted opening, the connection device configured to be received in stationary manner in the inner cavity of the receiver member, the connection device including a cage having two branches forming a pair of jaws for coming into engagement in the groove of the fastener member through a constricted opening, the connection device further comprising:
    a resilient drive member for urging a spacer member between the jaws so as to space the jaws apart in such a manner as to come into engagement with the groove through the constricted opening; and
    a pivotable lever that pivots about a pivot pin, the pivotable lever comprising a lever arm that is accessible and configured to be gripped manually, and a thrust head that comes into engagement with the spacer member so as to move the space member out from the jaws against the force exerted by the resilient drive member on the spacer member; and
    the receiver member including a cutout presenting a continuous annular edge in which the lever arm is arranged;
  removing the pivotable lever and the pivot pin from the cage;
  engaging the cage in the cavity of the receiver member;
  putting the pivotable lever into place with the pivot pin in the cage through the cutout;
  moving the assembled connection device in the cavity so as to engage ends of the pivot pin below the edges of the cutout; and
  blocking the cage in the cavity of the receiver member.

12. A connection device for assembling together a receiver first section member presenting an inner cavity, and a fastener second section member presenting a groove having a constricted opening, the connection device configured to be received in stationary manner in the inner cavity of the receiver member; the connection device comprising:
  a cage having two branches forming a pair of jaws for coming into engagement in the groove of the fastener member through a constricted opening;
  a spring that urges a spacer member between the jaws so as to space the jaws apart in such a manner as to come into engagement with the groove through the constricted opening; and
  a pivotable lever that pivots about a pivot pin, the pivotable lever comprising a lever arm that is manually accessible and configured to be manually gripped and operated to move a thrust head into engagement with the spacer member so as to move the space member out from the jaws against the force exerted by the spring on the spacer member.

* * * * *